United States Patent [19]

Kang

[11] Patent Number: 5,894,594

[45] Date of Patent: Apr. 13, 1999

[54] VOICE ANNOUNCEMENT BROADCASTING TECHNIQUE FOR BASE STATION OF CT-2 CORDLESS TELEPHONE

[75] Inventor: Chang-Yong Kang, Seoul, Rep. of Korea

[73] Assignee: SamSung Electronics Co., Ltd., Suwon, Rep. of Korea

[21] Appl. No.: 08/829,309

[22] Filed: Mar. 31, 1997

[30] Foreign Application Priority Data

Mar. 30, 1996 [KR] Rep. of Korea .......... 96/9617

[51] Int. Cl.$^6$ .......... H04M 11/10
[52] U.S. Cl. .......... 455/412; 455/414; 455/561; 379/88.07
[58] Field of Search .......... 455/414, 412, 455/426, 462–465, 561, 563, 567; 379/88.07, 88.28; 704/270, 272; 370/328, 329, 465, 466, 467

[56] References Cited

U.S. PATENT DOCUMENTS

| | | | |
|---|---|---|---|
| 4,942,598 | 7/1990 | Davis | 455/412 |
| 5,220,594 | 6/1993 | Ohnishi et al. | 455/412 |
| 5,313,515 | 5/1994 | Allen et al. | 379/88 |
| 5,321,739 | 6/1994 | Higashiyama | 379/61 |
| 5,329,578 | 7/1994 | Brennan et al. | 379/67 |
| 5,469,491 | 11/1995 | Morley, Jr. et al. | 379/88 |
| 5,657,376 | 8/1997 | Espeut et al. | 379/89 |
| 5,774,131 | 6/1998 | Kim | 345/503 |
| 5,778,314 | 7/1998 | Sudo et al. | 455/412 |

Primary Examiner—Reinhard J. Eisenzopf
Assistant Examiner—Darnell R. Armstrong
Attorney, Agent, or Firm—Robert E. Bushnell, Esq.

[57] ABSTRACT

A voice announcement technique for directly accessing a memory containing voice announcement data stored therein at the final output stage of the base station unit of a CT-2 digital cordless telephone system includes: a memory for storing voice announcement data therein; a conversion unit for converting voice announcement data received from the memory into a radio signal according to a CT-2 format, and for outputting the radio signal, a direct memory access control unit for accessing the data from the memory in a direct memory access manner when receiving a transfer request signal, and for sending the accessed data to a data bus, and an interface unit coupled between the conversion unit and the direct memory access control unit, the interface unit dividing the frequency of a direct memory access clock output from the conversion unit, and for generating the transfer request signal, while sending the data on the data bus to the conversion unit when the direct memory access control unit generates a transfer acknowledge signal.

6 Claims, 6 Drawing Sheets

VOICE ANNOUNCEMENT BROADCASTING TECHNIQUE FOR BASE STATION OF CT-2 CORDLESS TELEPHONE

CLAIM OF PRIORITY

This application makes claims all benefits accruing under 35 U.S.C. § 119 from an application for ANNOUNCEMENT BROADCASTING METHOD AND APPARATUS OF BASE STATION earlier filed in the Korean Industrial Property Office on Mar. 30, 1996 and there duly assigned Ser. No. 9617/1996.

BACKGROUND OF THE INVENTION

1. Field of the Invention

The present invention relates to a digital cordless telephone system, and more particularly to technique for sending a broadcast voice announcement from a base station of a CT-2 cordless telephone.

2. Description of the Related Art

Generally, a base station unit in a second generation cordless telephone system (hereinafter, this system is referred to as a "CT-2" system) sends a voice announcement to a subscriber prior to the execution of a call service for the subscriber.

In an earlier CT-2 cordless telephone system, when a link is established between the base station unit and a subscriber, the base station must send voice announcement data to the subscriber. In order to send voice announcement data, a control unit included in the base station unit reads voice stated from a memory which is included in the base station unit. The voice stated is pulse coded modulation data. The control unit then sends the pulse coded modulation data read from the memory to a switching unit. The control unit continuously executes its original operation and then executes its switching operation to send the pulse coded modulation data from the control unit to an encoder. The encoder is an adaptive differential pulse coded modulation encoder which compresses the pulse coded modulation data output from the switching unit and converts the compressed data into adaptive differential pulse coded modulation data. This data is supplied to a formatter which may be a CT-2 formatter. The formatter converts the compressed data into a CT-2 format and outputs a radio frequency signal.

When the formatter outputs the voice announcement data, the switching unit outputs an interrupt signal to the control unit. In response to the interrupt signal, the control unit stops its operation and then jumps into an interrupt routine, and thereafter, the control unit executes the above-mentioned procedure.

Although the memory and encoder are respectively a source and a destination of voice announcement pulse coded modulation data in the above-mentioned configuration, they are configured to send and receive data via the control unit and the switching unit. However, the switching unit basically has a configuration which is not required for voice announcement broadcasting but is required for a normal call service. The control unit basically has a configuration required for services other than the call service. Where the control unit is configured to execute another function associated with voice announcement broadcasting, there is a disadvantage in that the control unit is overloaded. Moreover, the memory stores pulse coded modulation data in spite of the fact that the data to be finally used for broadcasting is adaptive differential pulse coded modulation data. Since pulse coded modulation data requires more storage space than the compressed data, there is a problem in that the memory which is adapted to store voice data for voice announcement broadcasting is inefficiently used.

The following U.S. patents each disclose features in common with the present invention but do not teach or suggest the specifically recited combination of features of the present invention:

U.S. Pat. No. 5,469,491 to Morley Jr. et al., entitled Telephone Answering Service With Integrated Voice And Textual Message Storage, U.S. Pat. No. 5,329,578 to Brennan et al., entitled Personal Communication Service With Mobility Manager, U.S. Pat. No. 5,321,739 to Higashiyama, entitled Cordless Telephone Apparatus With Message Recording And Reproducing Means, and U.S. Pat. No. 5,313,515 to Allen et al., entitled Call Completion System With Message Writing Indication Upon Registration Of Mobile With Basestatuion.

SUMMARY OF THE INVENTION

Therefore, an object of the invention is to provide a voice announcement technique for directly accessing a memory containing voice announcement data stored therein at the final output stage of the base station unit in a digital cordless telephone system.

Another object of the invention is to provide a voice announcement technique for storing voice announcement data in the form of compressed data to be processed at the final output stage in a digital cordless telephone system, and directly accessing a memory containing the voice announcement data stored therein at the final output stage, thereby performing a voice announcement.

In accordance with one aspect, the present invention provides a voice announcement apparatus for a base station unit in a CT-2 cordless telephone system comprising: a memory for storing voice announcement data therein; a conversion unit for converting voice announcement data received from the memory into a radio signal according to a CT-2 format, and for outputting the radio signal; a direct memory access control unit for accessing the data from the memory in a direct memory access manner when receiving a transfer request signal, and for sending the accessed data to a data bus; and an interface unit coupled between the conversion unit and the direct memory access control unit, the interface unit dividing the frequency of a direct memory access clock output from the conversion unit so as to generate the transfer request signal, while sending the data on the data bus to the conversion unit when the direct memory access control unit generates a transfer acknowledge signal.

In accordance with another aspect, the present invention provides a voice announcement method used in a base station unit of a CT-2 cordless telephone system, the base station unit including a memory for storing voice announcement data therein and a conversion unit for converting data supplied thereto into data according to a CT-2 format and for outputting the converted data, the method comprising the steps of: opening a data bus at the conversion unit when the conversion unit requests a direct memory access; controlling the conversion unit to access the voice announcement data stored in the memory in a direct memory access manner; and converting the accessed voice announcement data into data according to the CT-2 format, and broadcasting the converted data.

BRIEF DESCRIPTION OF THE DRAWINGS

A more complete appreciation of the invention, and many of the attendant advantages thereof, will be readily apparent

3 as the same becomes better understood by reference to the following detailed description when considered in conjunction with the accompanying drawings in which like reference symbols indicate the same or similar components, wherein:

FIGS. 5A–5G together form a timing diagram illustrating operation characteristics of various elements of the interface unit of FIG. 4.

DETAILED DESCRIPTION OF THE PREFERRED EMBODIMENT(S)

Figure 1:
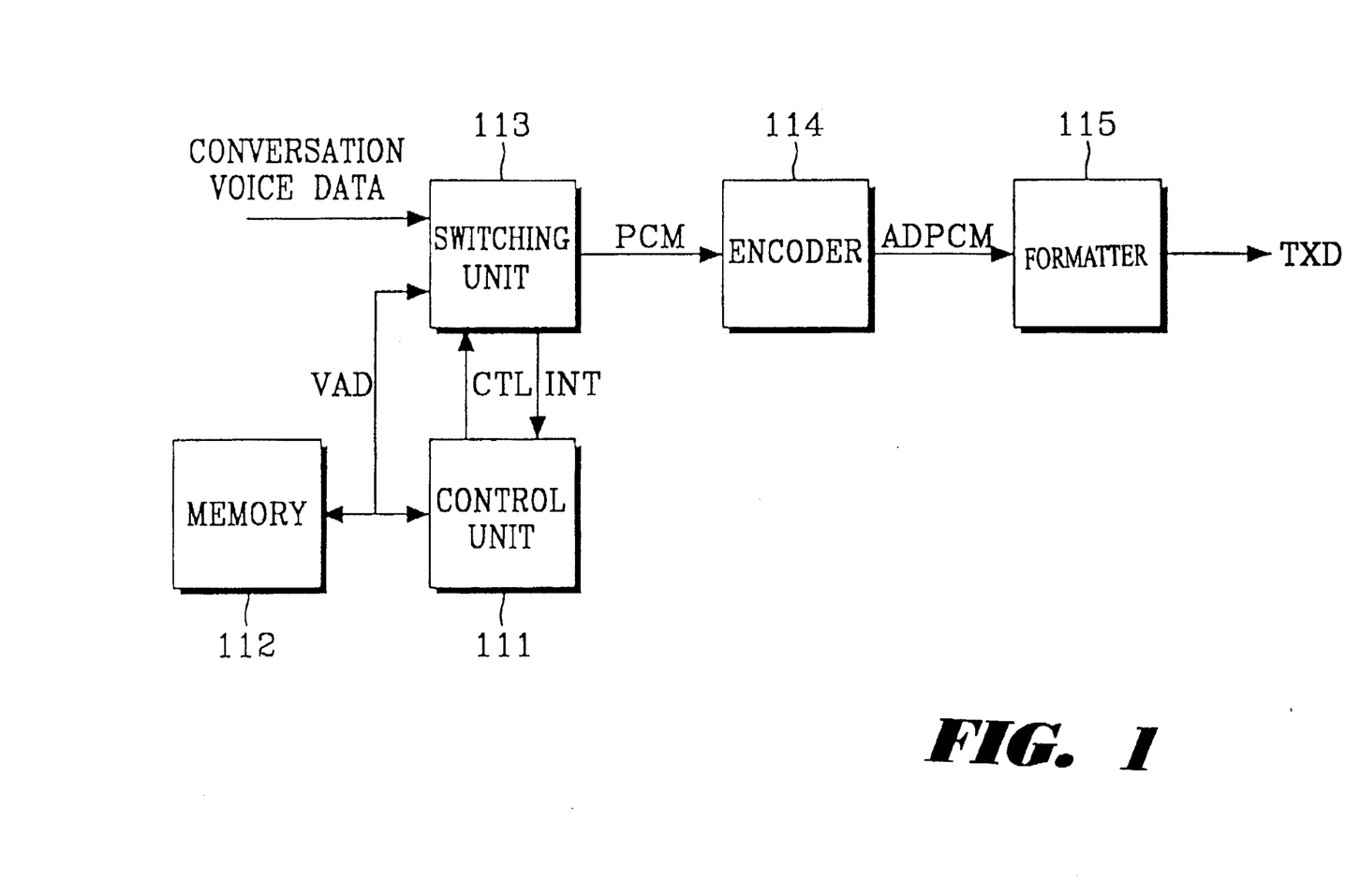
FIG. 1 is a block diagram illustrating an earlier configuration for realizing an announcement broadcast in a base station system.
Figure 2:
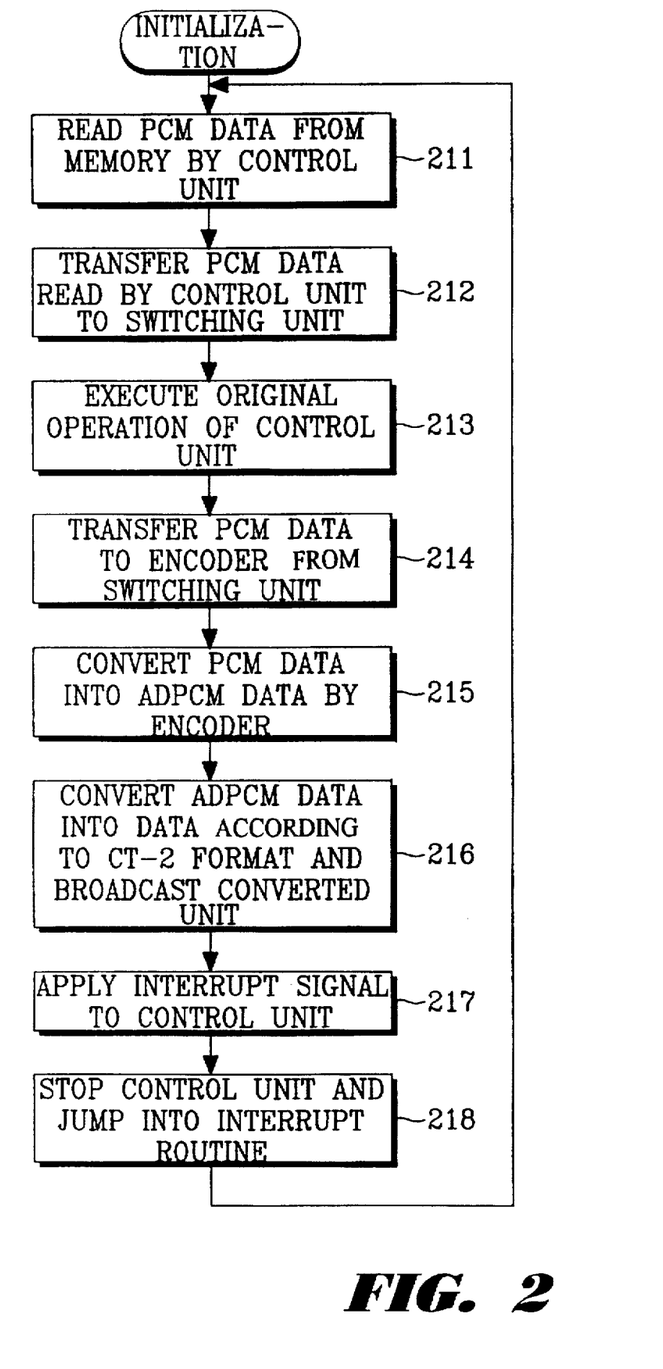
FIG. 2 is a flowchart illustrating the procedure of executing an announcement broadcast using the configuration of FIG. 1.

FIG. 1 is a block diagram illustrating a configuration for sending a voice announcement from a base station unit included in a CT-2 cordless telephone system and FIG. 2 is a flowchart illustrating the procedure of sending a voice announcement from the base station unit using the configuration of FIG. 1.

When a link is established between the base station unit and a subscriber, the base station must send voice announcement data to the subscriber. In order to send voice announcement data, a control unit 111 included in the base station unit reads voice data from a memory 112 which is also included in the base station unit (Step 211 in FIG. 2). The voice data is pulse-coded modulation (PCM) data. The control unit 111 then sends the PCM data read from the memory 112 to switching unit 113 (Step 212). Under this condition, the control unit 111 continuously executes its original operation (Step 213). The switching unit 113 executes its switching operation to send the PCM data from the control unit 111 to an encoder 114 (Step 214). The encoder 114 is an adaptive differential pulse-coded modulation (ADPCM) encoder. The encoder 114 compresses the PCM data output from the switching unit 113 and converts the compressed data into ADPCM data (Step 215). This ADPCM data is supplied to a formatter 115 which may be a CT-2 formatter. The formatter 115 converts the ADPCM data into a CT-2 format, and a radio frequency (RF) signal is output (Step 216).

When the formatter 115 outputs voice announcement data, the switching unit 113 outputs an interrupt signal to the control unit 111. In response to the interrupt signal, the control unit 111 stops its operation and then jumps into an interrupt routine. Thereafter, the control unit 111 executes the above-mentioned procedure (Steps 217 and 218).

Although the memory 112 and encoder 114 are respectively a source and a destination of voice announcement PCM data in the above-mentioned configuration, they are configured to send and receive data via the control unit 111 and switching unit 113. However, the switching unit 113 basically has a configuration which is not required for voice announcement broadcasting, but is required for a normal call service. The control unit 111 basically has a configuration required for services other than the call service. Where the control unit 111 is configured to execute another function associated with voice announcement broadcasting, there is a disadvantage in that the control unit is over-loaded. Moreover, the memory 112 stores PCM data, in spite of the fact that the data to be finally used for broadcasting is ADPCM data. Since PCM data requires more storage space than ADPCM data, there is a problem in that the memory 112, which is adapted to store voice data for voice announcement broadcasting, is inefficiently used.

Figure 3:
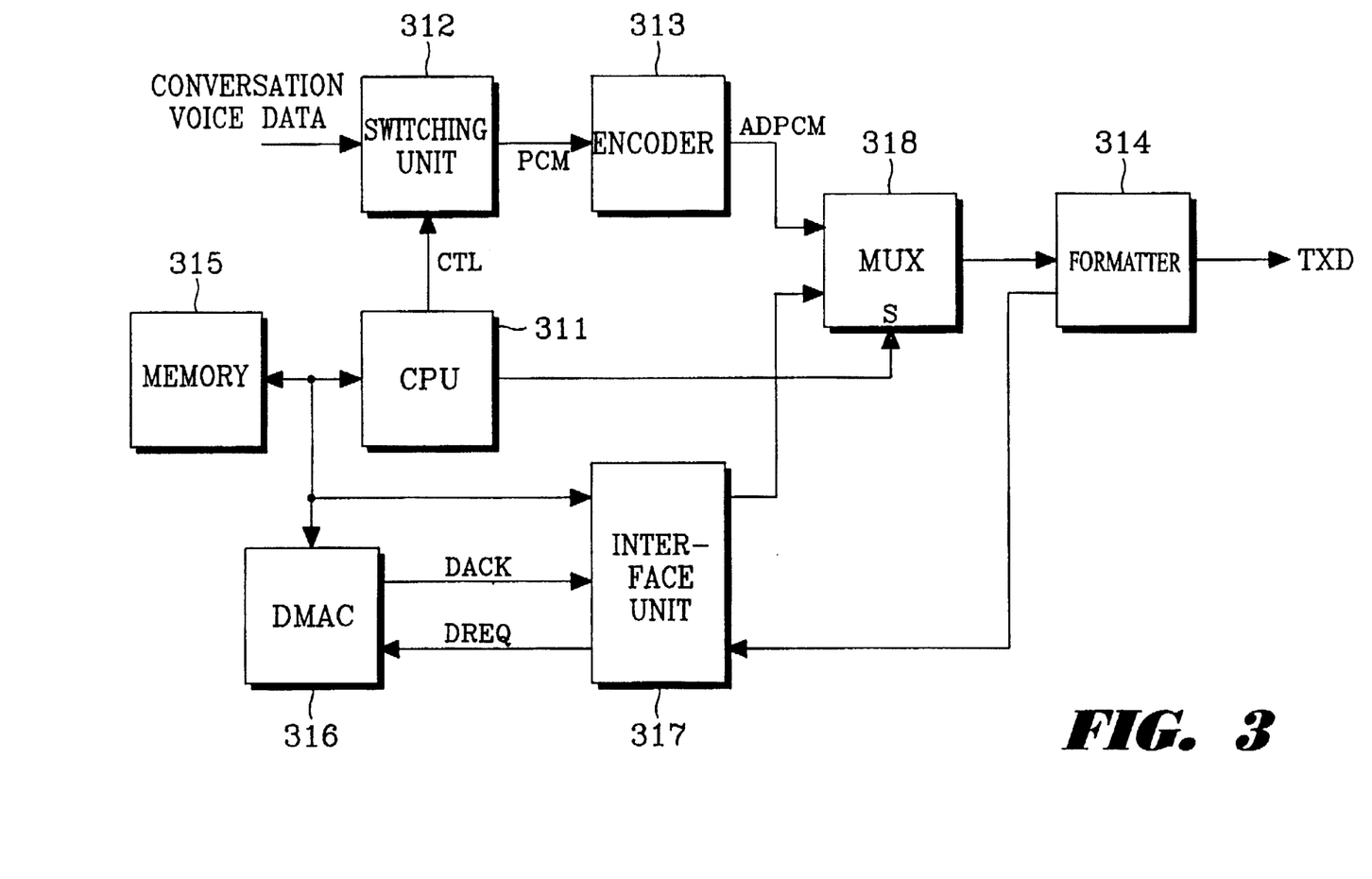
FIG. 3 is a block diagram illustrating an apparatus for realizing an announcement broadcast in a base station system in accordance with the present invention.

FIG. 3 illustrates a voice announcement apparatus incorporated in a base station unit for a CT-2 cordless telephone system in accordance with the present invention. As shown in FIG. 3, the voice announcement apparatus according to the present invention includes a central processing unit (CPU) 311 for controlling the overall operation of the base station unit. The voice announcement apparatus also includes a switching unit 312 coupled to a PCM coder-decoder (CODEC). The switching unit 312 serves to execute a channel switching function for conversation voice data under control of the CPU 311. The switching unit 312 is a time switch circuit. An encoder 313 is coupled to the switching unit 312. The encoder 313 serves to compress PCM voice data output from the switching unit 312 into ADPCM data. The voice announcement apparatus further includes a formatter 314 coupled to the encoder 313 and adapted to convert the ADPCM data received from the encoder 313 into data within a CT-2 format, and a memory unit 315 containing voice announcement data for executing a voice announcement function of the base station unit. The voice announcement data is stored in the form of ADPCM data. A direct memory access controller (DMAC) 316 is also provided for receiving a transfer request signal DREQ. When the DMAC 316 receives the transfer request signal DRFQ, it reports the receipt of the transfer request signal to the CPU 311. The DMAC 316 also receives a signal responding to the report from the CPU 311. When the DMAC 316 receives the response signal from the CPU 311, it generates a transfer acknowledge signal DACK. Simultaneously, the DMAC 316 controls the memory unit 315 so that the data bus directly accesses voice announcement data. The voice announcement apparatus further includes an interface unit 317 for dividing the frequency of a DMA clock generated from the formatter 314 and for generating a transfer request signal DREQ which is, in turn, supplied to the DMAC 316. The DMAC 316 sends voice announcement data VAD to the data bus upon receiving the transfer acknowledge signal DACK. A multiplexer 318 is also provided for receiving the conversation voice data from the encoder 313 which has the form of ADPCM data. The multiplexer 318 also receives the voice announcement data from the interface 317 which has the form of ADPCM data. The multiplexer 318 selects one of the received voice data in accordance with a select signal S output from the CPU 311. The selected voice data from the multiplexer 318 is sent to the formatter 314.

The configuration of FIG. 3 is basically associated with the sending of voice announcement data from the base station unit. Accordingly, the memory unit 315 consists of a memory adapted to store programs, a memory adapted to temporarily store data and a voice memory adapted to store voice announcement data. Although the memory unit 315 consists of such memories, the following description will be made in conjunction with only the voice memory adapted to store voice announcement data. The switching unit 312, encoder 313 and formatter 314 will also be described in conjunction with operations associated with the transmission system.

First, the formatter 314 requests a DMA function to transfer voice announcement data. That is, the formatter 314 supplies a DMA clock to the interface unit 317. The interface unit 317 divides the frequency of the received DMA clock. When the interface unit 317 receives a predetermined number of DMA clocks, it generates a transfer request signal DREQ which is, in turn, supplied to the DMAC 316. When the DMAC 316 receives the transfer request signal DREQ, it informs the CPU 311 of the generation of the request for the DMA function. In response to the information, the CPU 311 generates a select signal for allowing the multiplexer 318 to select voice announcement data. The CPU 311 simultaneously opens the data bus while reporting this fact to the DMAC 316.

The DMAC 316 then sends a transfer acknowledge signal DACK to the interface unit 317 and directly accesses to the memory 315 so that voice announcement data is sent to the data bus. When the interface unit 317 receives the transfer acknowledge signal DACK, it stores the voice announcement data on the data bus and outputs the stored voice announcement data to the multiplexer 318. Since the multiplexer 318 is adapted to selectively output the data from the interface unit 317, the voice announcement data from the interface unit 317 is sent to the formatter 314 via the multiplexer 318. The formatter 314 converts the received voice announcement data having the form of ADPCM data into data having a CT-2 format and outputs the resultant data.

During the above-mentioned operation, the interface unit 317 periodically generates the transfer request signal DREQ at a desired time interval. In response to every transfer request signal DREQ, the DMAC 316 generates a transfer acknowledge signal DACK. Accordingly, the above-mentioned DMA operation for voice announcement data is continuously carried out.

Figure 4:
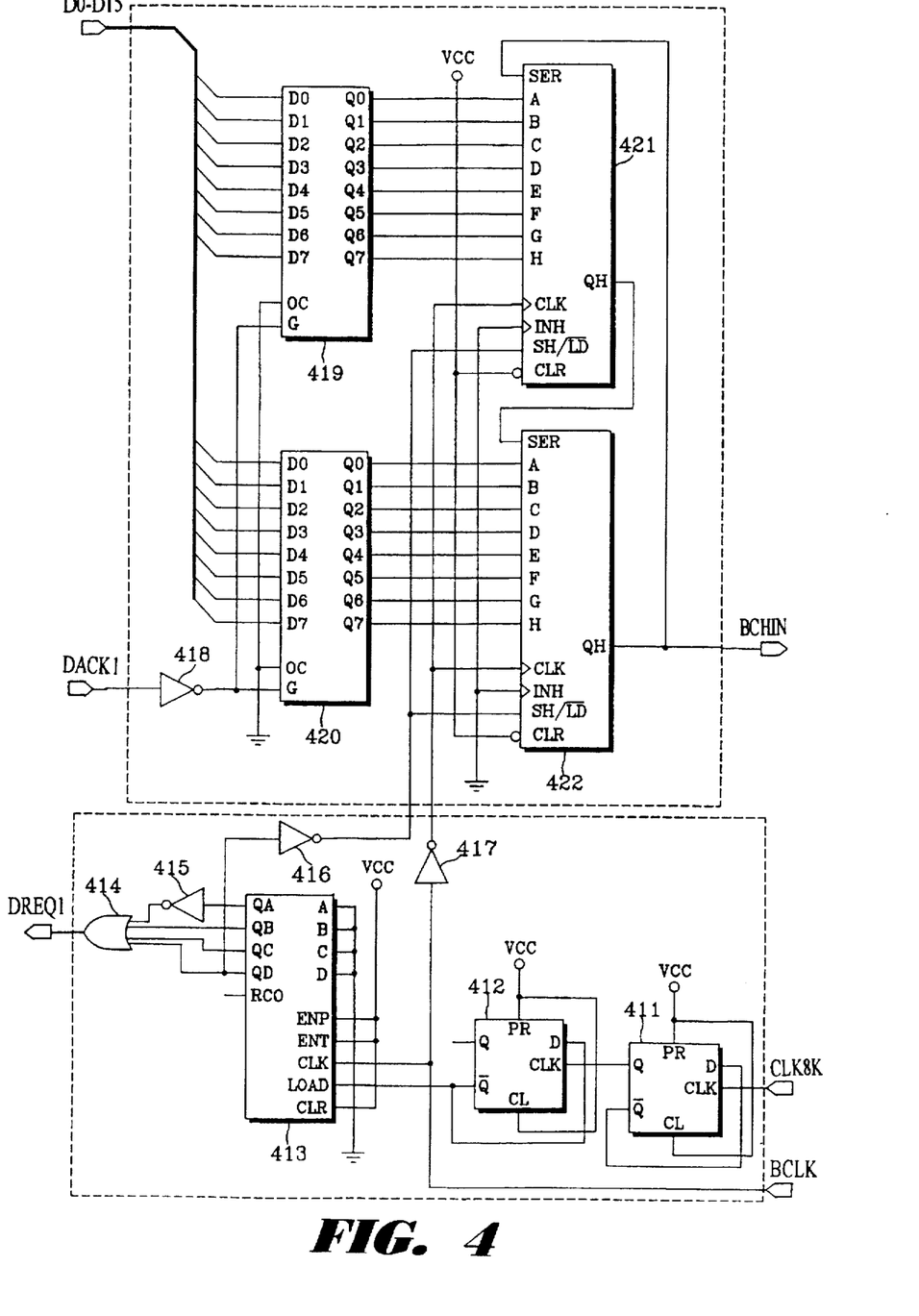
FIG. 4 is a block diagram illustrating an interface unit included in the base station system according to the present invention, the interface unit controlling a formatter to directly access data stored in a memory.

FIG. 4 illustrates a configuration employed in a base station unit for realizing voice announcement broadcasting in accordance with the DMA function. FIG. 4 is a block diagram illustrating a concrete circuit of the interface unit 317 shown in FIG. 3. The port BCHIN shown on the right portion of FIG. 4 is an output port for voice announcement data coupled to the multiplexer 318. The ports CLK8K and BCLK shown on the right portion of FIG. 4 are input ports for DMA clocks output from the formatter 314, respectively. The formatter 314 used in accordance with the present invention may be a commercially available integrated circuit, part number AM79C411, manufactured by the AMD Corporation. The port DREQ shown on the left portion of FIG. 4 is a data request signal output port coupled to the DMAC 316 whereas the port DACK is a data acknowledge signal input terminal coupled to the DMAC 316. The DMAC 316 used in accordance with the present invention may be a commercially available integrated circuit, part number MC68431, manufactured by the Motorola Corporation. The MC68431 integrated circuit is a microprocessor having a DMAC. In other words, the MC68431 integrated circuit is an integrated circuit capable of simultaneously performing the functions of both the CPU 311 and the DMAC 316.

As shown in FIG. 4, the interface unit includes a pair of flip flops 411 and 412 which serve to quadrantally divide the frequency of the clock CLK8K. The interface unit also includes a counter 413, an OR gate 414 and an inverter 415.

The counter 413 receives a frequency-quadrant signal output from the flip flop 412 as a load signal. The counter 413 also receives the clock BCLK. Based on the received signals, the counter 413 generates timing signals which are, in turn, supplied to the OR gate 414 and inverter 415. As a result, the OR gate 414 generates a transfer request signal DREQ which is supplied to the port DREQ. FIG. 4 shows an exemplary configuration wherein a transfer request signal DREQ is generated at the first BCLK after the generation of the load signal. The interface unit further includes 8-bit latches 419 and 420 coupled to a 16-bit data bus. The 8-bit latches 419 and 420 both receive a transfer acknowledge signal DACK via an inverter. In response to the transfer acknowledge signal DACK, the 8-bit latches 419 and 420 latch voice announcement data on the data bus and output the latched data. A pair of shift registers 421 and 422 are coupled to the counter 413. The shift registers 421 and 422 receive a signal output at an output terminal QD of the counter 413 as a shift/load signal. The signal output at the output terminal QD of the counter 413 is maintained as a shift signal for a period corresponding to 15 BCLK's while being maintained as a load signal for a subsequent period corresponding to one BCLK. This variation in the status of the signal QD is repeated at an interval of 16 BCLK's. The shift registers 421 and 422 load the 16-bit voice announcement data output from the latches 419 and 420 in the load period. In the shift period, the shift registers 421 and 422 shift the load voice announcement data, thereby converting the voice announcement data into serial data.

FIGS. 5A–5G together form a timing diagram illustrating operation characteristics of various units shown in FIG. 4. Various timing signals are generated by the 4-bit counter 413 which carries out a timing operation using clocks CLK8K and BCLK. An output from the counter 413 is decoded to generate a transfer request signal DREQ. In response to the transfer request signal DREQ, the DMAC 316 generates a transfer acknowledge signal DACK. Voice announcement data on the data bus is latched by the transfer response signal DACK. The latched voice announcement data is loaded in a parallel manner and then shifted so that it is converted into serial data. The serial data is then supplied to the multiplexer 318 which, in turn, sends the data to the formatter 314. The DMA data has a length of 16 bits. The number of repeated DMA operations is 2,000 per second.

In FIGS. 5A–5G, the reference numeral 512 denotes a timing clock BCLK at which the formatter 314 scans ADPCM voice announcement data in a serial manner. That is, the formatter 314 receives voice announcement data in sync with the serial conversion of the voice announcement data at the rising edge of the clock BCLK and then processes the received voice announcement data. The reference numeral 511 is a clock CLK8K output from the formatter 314. The clock CLK8K is a signal of 8 KHz which indicates the starting point of an ADPCM data sample of 4 bits. In other words, one cycle of the clock CLK8K corresponds to four cycles of the clock BCLK. Serial data of 4 bits are output at the rising edges of four BCLK's following the rising edge of the clock CLK8K, respectively. Accordingly, one sample, which is 4-bit ADPCM data, is converted into serial data by four BCLK's.

Therefore, the DMA operation is carried out one time for 4 cycles of the clock CLK8K because the DMA data output from the DMAC 316 has a length of 16 bits. To this end, the flip flops 411 and 412, which are each divide by two frequency dividers and are serially connected to each other, serve to quadrantally divide the frequency of the clock CLK8K. The flip flop 412 outputs a frequency-quadrant signal in accordance with the quadrantal frequency division of the clock CLK8K. This frequency-quadrant signal is denoted by the reference numeral 513 in FIGS. 5A-5G. The frequency-quadrant signal is supplied to the 4-bit counter 413 as a load signal. Based on the load signal, the counter 413 loads "0000". At this time, the counter 413 performs a loading function at a low logic value of the load signal. Accordingly, the loading operation is activated for two cycles of the clock CLK8K, thereby preventing the counter 413 from executing a counting operation. As a result, the counter 413 outputs "0000" at its output terminals QD, QC, QB and QA. When the loading operation is inactivated for the last two cycles of the clock CLK8K at which the load signal has a high logic value, the counter 413 begins to count the clock BCLK. At this time, the OR gate 414 and inverter 415 perform a decoding function for generating a transfer request signal DREQ for requesting the execution of a DMA operation. That is, the OR gate 414 and inverter 415 generate a transfer request signal DREQ having a low logic value at the point of time when the outputs at the output terminals QD to QA of the counter 413 correspond to "0001". This transfer request signal DREQ is denoted by the reference numeral 514 in FIGS. 5A-5G.

Figure 5A:
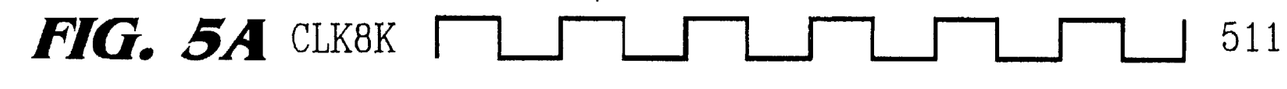
Figure 5B:
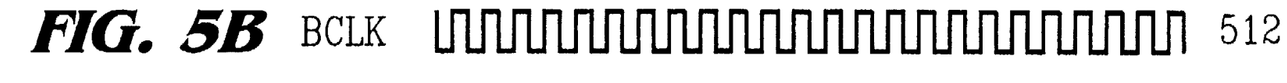
Figure 5C:
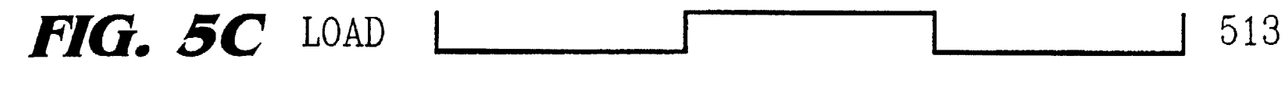
Figure 5D:
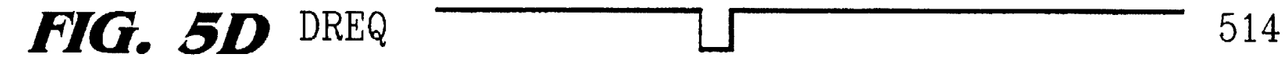
Figure 5E:
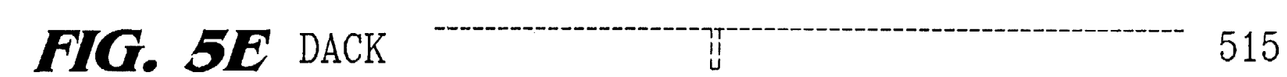
Figure 5F:
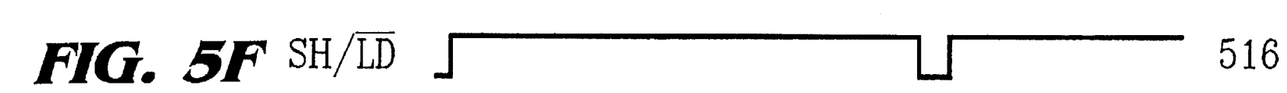
Figure 5G:
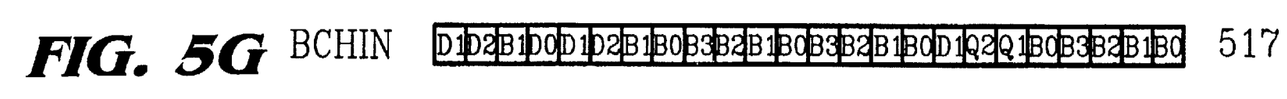

When the transfer request signal DREQ is generated, the DMAC 315 informs the CPU 311 of this fact. In response to this information, the CPU 311 opens the data bus to assign the control for the memory 315 to the DMAC 316. Accordingly, the DMAC 316 generates a transfer acknowledge signal DACK and activates the DMA function to control the memory 315. That is, the DMAC 316 accesses to four samples of ADPCM voice announcement data and sends them to the 16-bit data bus.

The transfer acknowledge signal DACK is inverted by the inverter 418 to have a low logic value. This transfer acknowledge signal DACK is denoted by the reference numeral 515 in FIGS. 5A-5G. The transfer acknowledge signal DACK from the inverter 418 is supplied to the latches 419 and 420 which, in turn, latch and store the 16-bit voice announcement data from the data bus in accordance with the transfer acknowledge signal DACK. The latches 419 and 420 are 8-bit latches each latching two samples of voice announcement data, thereby totally latching four samples of voice announcement data.

The output at the output terminal QD of the counter 413 is a signal which has a high logic value at the eighth BCLK received in an interval corresponding to the last two samples. The output at the output terminal QD of the counter 413 is inverted by an inverter 416 which, in turn, outputs a signal denoted by the reference numeral 516 in FIGS. 5A-5G. The signal 516 output from the inverter 416 is supplied to the shift registers 421 and 422 as a shift/load signal. Since the shift register 421 is coupled at its serial output terminal QH to the serial input terminal SER of the shift register 422, those shift registers 421 and 422 cooperate to perform the function of a 16-bit shift register. The shift registers 421 and 422 load 16-bit voice announcement data output from the latches 419 and 420, respectively, when the shift/load signal supplied thereto has a low logic value. When the shift/load signal has a high logic value, the shift registers 421 and 422 shift the parallel-loaded voice announcement data in accordance with the clock BCLK which is inverted by an inverter 417, thereby causing the voice announcement data to be converted into serial data. As a result, the shift registers 421 and 422 send the voice announcement data to the port BCHIN one bit at a time in a serial manner at the descending edge of every BCLK. The formatter 314 reads the serial data at the rising edge of every BCLK.

The case illustrated in FIGS. 4 and 5A-5G is associated with the case wherein the formatter 314 is the AM79C411 integrated circuit manufactured by, the AMD Corporation. The AM79C411 integrated circuit uses a serial data transfer system for transferring external data to the formatter 314. Accordingly, FIG. 4 shows a configuration for converting 16-bit parallel data accessed in accordance with the DMA operation into serial data. However, the formatter 314 may not use the serial data transfer system which is used for the AM79C411 integrated circuit. Where a voice announcement broadcast is realized using a DMA system in a CT-2 public base station unit in accordance with the present invention, a parallel data transfer system is used. In this case, the configuration of the interface unit 317 is appropriately changed.

Figure 6:
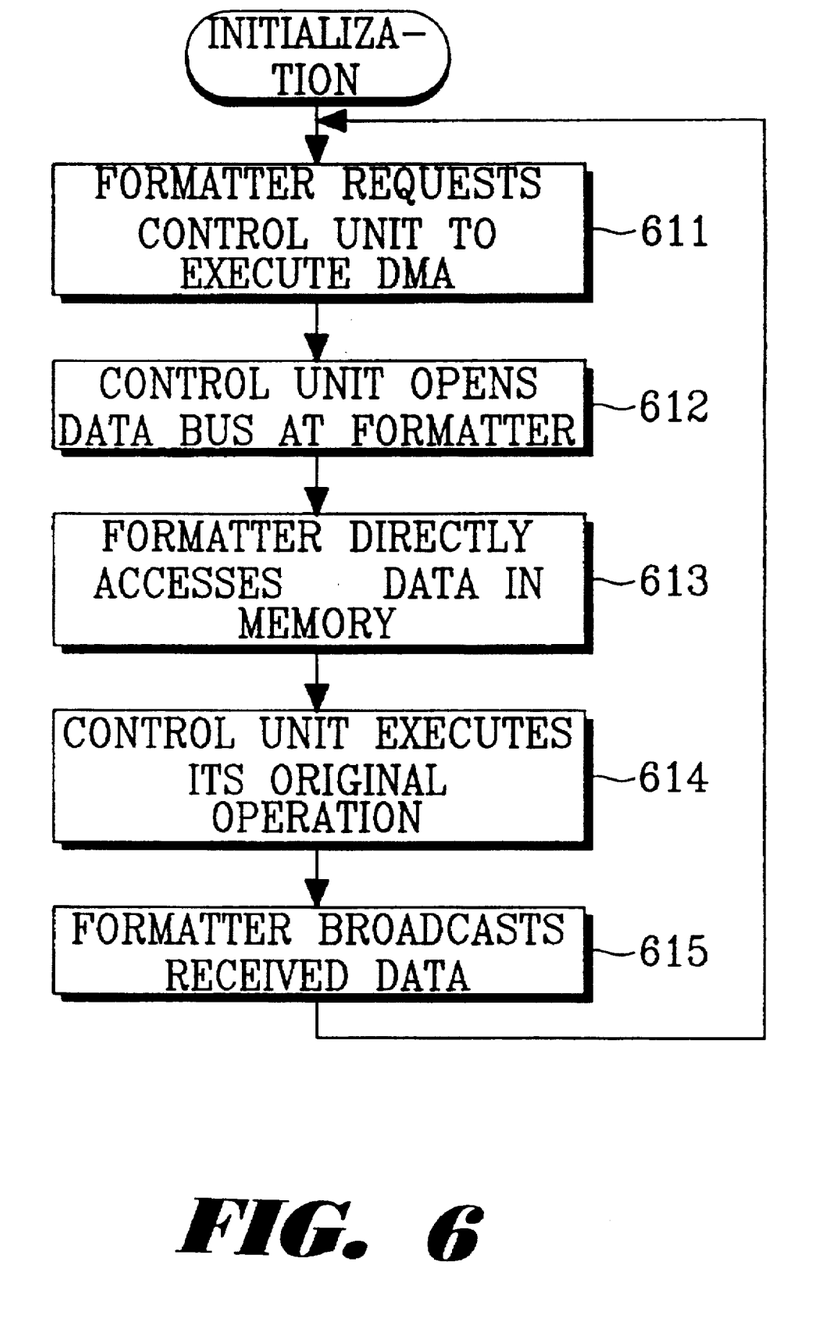
FIG. 6 is a flowchart illustrating sequential procedures for executing a voice announcement broadcast using the configuration shown in FIGS. 3 and 4.

FIG. 6 is a flowchart illustrating sequential operations of the base station unit for executing a voice announcement broadcast function in accordance with the present invention. When the CT-2 formatter 314 requests the DMAC 316 to execute a DMA operation, the DMAC 316 informs the CPU 311 of this request (Step 611). In response to this report, the CPU 311 stops its operation and opens the data bus at the DMAC 316 (Step 612). Accordingly, the DMAC 316 directly accesses the voice announcement data stored in the memory 315 and sends the accessed voice announcement data to the open data bus (Step 613). The CPU 311 then closes the data bus and again executes its operation (Step 614). Subsequently, the formatter 314 receives the data on the data bus, converts the received data into data according to the CT-2 format, and outputs the converted data (Step 615).

The formatter 314 processes and outputs voice announcement data accessed by the DMAC 316 while repetitively executing the above-mentioned operation.

Where the above-mentioned CT-2 public base station unit is configured in accordance with the present invention, the efficiency of the memory can be improved because voice announcement data is directly stored in the memory in the form of ADPCM data. In accordance with the present invention, it is also possible to directly scan the voice announcement data having the form of ADPCM data in the B-channel of the formatter, thereby realizing the voice announcement function. Since the voice announcement data is transferred in accordance with the DMA function, it is also possible to reduce the load of the CPU.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A voice announcement apparatus for a base station unit of a CT-2 cordless telephone system, comprising:

a memory for storing voice announcement data therein;

a conversion unit for converting voice announcement data received from said memory into a radio signal according to a CT-2 format, and for outputting said radio signal;

a direct memory access control unit for accessing the data from said memory in a direct memory access manner when receiving a transfer request signal, and for sending said accessed data to a data bus; and an interface unit coupled between said conversion unit and said direct memory access control unit, said interface unit dividing the frequency of a direct memory access clock output from said conversion unit, and for generating said transfer request signal, while sending the data on the data bus to said conversion unit when said direct memory access control unit generates a transfer acknowledge signal.

2. A voice announcement apparatus for a base station unit of a CT-2 cordless telephone system, comprising:

a memory for storing voice announcement data therein in the form of adaptive differential pulse-coded modulation data;

a conversion unit for converting serial voice announcement data received from said memory into a radio signal according to a CT-2 format, and for outputting said radio signal;

a direct memory access control unit for accessing said memory in a direct memory access manner when receiving a transfer request signal, and for sending data accessed from said memory to a data bus; and an interface unit coupled between said conversion unit and said direct memory access control unit, said interface unit dividing the frequency of a direct memory access clock output from said conversion unit, and for generating said transfer request signal, while converting parallel data on said data bus into serial data and sending said converted data to said conversion unit when said direct memory access control unit generates a transfer acknowledge signal.

3. A voice announcement method used in a base station unit of a CT-2 cordless telephone system, said base station unit including a memory for storing voice announcement data therein and a conversion unit for converting data supplied thereto into data according to a CT-2 format and outputting said converted data, the method comprising the steps of:

opening a data bus at said conversion unit when said conversion unit requests a direct memory access;

controlling said conversion unit to access the voice announcement data stored in said memory in a direct memory access manner; and converting the accessed voice announcement data into data according to said CT-2 format, and broadcasting said converted data.

4. A voice announcement apparatus for a base station unit of a cordless telephone system, comprising:

a memory for storing voice announcement data therein;

a conversion unit for converting voice announcement data received from said memory into a radio signal according to a predetermined format, and for outputting said radio signal;

a direct memory access control unit for accessing the data from said memory in a direct memory access manner when receiving a transfer request signal, and for sending said accessed data to a data bus; and an interface unit coupled between said conversion unit and said direct memory access control unit, said interface unit dividing the frequency of a direct memory access clock output from said conversion unit, and for generating said transfer request signal, while sending the data on the data bus to said conversion unit when said direct memory access control unit generates a transfer acknowledge signal.

5. A voice announcement apparatus for a base station unit of a cordless telephone system, comprising:

a memory for storing voice announcement data therein in the form of adaptive differential pulse-coded modulation data;

a conversion unit for converting serial voice announcement data received from said memory into a radio signal according to a predetermined format, and for outputting said radio signal;

a direct memory access control unit for accessing said memory in a direct memory access manner when receiving a transfer request signal, and for sending data accessed from said memory to a data bus; and an interface unit coupled between said conversion unit and said direct memory access control unit, said interface unit dividing the frequency of a direct memory access clock output from said conversion unit, and for generating said transfer request signal, while converting parallel data on said data bus into serial data and sending said converted data to said conversion unit when said direct memory access control unit generates a transfer acknowledge signal.

6. A voice announcement method used in a base station unit of a cordless telephone system, said base station unit including a memory for storing voice announcement data therein and a conversion unit for converting data supplied thereto into data according to a predetermined format and outputting said converted data, the method comprising the steps of opening a data bus at said conversion unit when said conversion unit requests a direct memory access;

controlling said conversion unit to access the voice announcement data stored in said memory in a direct memory access manner; and converting the accessed voice announcement data into data according to said predetermined format, and broadcasting said converted data.

* * * * *